United States Patent
Sha et al.

(10) Patent No.: US 12,041,549 B2
(45) Date of Patent: Jul. 16, 2024

(54) TERMINAL ENERGY-SAVING METHOD, BASE STATION, TERMINAL, TERMINAL ENERGY-SAVING SYSTEM AND COMPUTER-READABLE STORAGE MEDIUM

(71) Applicant: ZTE CORPORATION, Guangdong (CN)

(72) Inventors: Xiubin Sha, Guangdong (CN); Bo Dai, Guangdong (CN); Ting Lu, Guangdong (CN); Xu Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 381 days.

(21) Appl. No.: 17/423,524

(22) PCT Filed: Jan. 13, 2020

(86) PCT No.: PCT/CN2020/071684
§ 371 (c)(1),
(2) Date: Jul. 16, 2021

(87) PCT Pub. No.: WO2020/147669
PCT Pub. Date: Jul. 23, 2020

(65) Prior Publication Data
US 2022/0124624 A1    Apr. 21, 2022

(30) Foreign Application Priority Data

Jan. 18, 2019    (CN) .......................... 201910049747.9

(51) Int. Cl.
*H04W 52/02*    (2009.01)

(52) U.S. Cl.
CPC .............................. *H04W 52/0235* (2013.01)

(58) Field of Classification Search
CPC .................................................. H04W 52/0235
(Continued)

(56) References Cited

U.S. PATENT DOCUMENTS

| | | | |
|---|---|---|---|
| 2012/0051274 A1* | 3/2012 | Song | H04W 48/10 370/329 |
| 2014/0029586 A1* | 1/2014 | Loehr | H04L 5/0055 370/336 |

(Continued)

FOREIGN PATENT DOCUMENTS

| | | |
|---|---|---|
| CN | 102917444 A | 2/2013 |
| CN | 103546968 A | 1/2014 |

(Continued)

OTHER PUBLICATIONS

First Office Action in corresponding RU Appl. No. 2021124382, dated Nov. 24, 2021 (nine (9) pages).

(Continued)

*Primary Examiner* — Mark G. Pannell
(74) *Attorney, Agent, or Firm* — KDW Firm PLLC

(57) ABSTRACT

Provided are a terminal energy-saving method, a base station and a terminal. One method includes: determining, by a base station, a first parameter of a user equipment (UE), where the first parameter includes at least one of a paging enhanced discontinuous reception (eDRX) parameter in an idle state or a deep sleep parameter in the idle state; and sending the first parameter.

19 Claims, 8 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2015/0043403 | A1 | 2/2015 | Martinez Tarradell et al. |
| 2016/0044578 | A1 | 2/2016 | Vajapeyam et al. |
| 2016/0295504 | A1 | 10/2016 | Wang et al. |
| 2017/0099649 | A1 | 4/2017 | Vos |
| 2017/0118737 | A1 | 4/2017 | Batchu |
| 2017/0311113 | A1 | 10/2017 | Abraham et al. |
| 2017/0339640 | A1 | 11/2017 | Krishnamoorthy et al. |
| 2017/0339745 | A1 | 11/2017 | Uchino et al. |
| 2017/0367044 | A1* | 12/2017 | Fujishiro ............... H04W 68/02 |
| 2017/0374645 | A1 | 12/2017 | Tirronen et al. |
| 2018/0014275 | A1* | 1/2018 | Fujishiro ............... H04W 36/08 |
| 2018/0014347 | A1* | 1/2018 | Nagasaka ............... H04W 8/22 |
| 2018/0049269 | A1* | 2/2018 | Fujishiro ........... H04W 52/0216 |
| 2018/0152978 | A1 | 5/2018 | Jia |
| 2018/0176883 | A1 | 6/2018 | Fujishiro |
| 2018/0343686 | A1* | 11/2018 | Manepalli ............. H04W 76/28 |
| 2020/0008042 | A1* | 1/2020 | Sugiyama ............. H04W 60/06 |
| 2020/0383168 | A1* | 12/2020 | Nagasaka ......... H04W 52/0212 |

FOREIGN PATENT DOCUMENTS

| | | |
|---|---|---|
| CN | 104812031 A | 7/2015 |
| CN | 107113716 A | 8/2017 |
| CN | 107371215 A | 11/2017 |
| CN | 107637142 A | 1/2018 |
| CN | 108174461 A | 6/2018 |
| CN | 108293273 A | 7/2018 |
| CN | 108307490 A | 7/2018 |
| CN | 110536383 A | 12/2019 |
| EP | 3280191 B1 | 2/2018 |
| KR | 101296578 B1 | 8/2013 |
| RU | 2549156 C2 | 5/2015 |
| RU | 2570895 C2 | 12/2015 |
| WO | 2012053841 A2 | 4/2012 |
| WO | 2013170448 A1 | 11/2013 |
| WO | 2018063467 A1 | 4/2018 |
| WO | 2018085725 A1 | 5/2018 |
| WO | 2018231000 A1 | 12/2018 |

OTHER PUBLICATIONS

Examination Report No. 1 dated Jun. 29, 2022, for Australian Patent Application No. 2020209603 three (3) pages).
First Office Action dated Jul. 19, 2022, for Korean Patent Application No. 10-2021-7026087 (12 pages).
InterDigital Communications, "Supporting Extended DRX in RRC_Idle mode", 3GPP TSG RAN WG2 Meeting #83 R2-132436, Barcelona, Spain Aug. 19-23, 2013.
Samsung, "Enhancements for extended DRX in Idle", 3GPP TSG RAN WG2 #83, R2-132613, Aug. 19 to 23, 2013, Barcelona, Spain.
Ericsson, "Wake Up Signal in NB-IoT and MTC", 3GPP TSG-RAN2 Meeting #101, R2-1802586, Athens, Greece, Feb. 26-Mar. 2, 2018.
The Extended European Search Report dated Sep. 28, 2022, for Application No. EP20740993 (14 pages).
Qualcomm Incorporated, "Combining RRC-Inactive and 5G Up optimization for efficient handling of bursty frequent small data", SA WG2 Meeting #128, S2-187276, Jul. 2-6, 2018, Vilnius, Lithuania.
3rd Generation Partnership Project; Technical Specification Group Services and System Aspects: Study on Cellular IoT Support and evolution for the 5G System (Release 16), 3GPP Standard; Technical Report; 3GPP TR 23.724, Mobile Competence Centre; 650 Route des Lucioles; F-06921 Sophia-Antipolis Cedex France, vol. SA WG2, No. 0.0 (2018).
Office Action for Chinese Application No. 201910049747.9, dated May 27, 2023, 34 pages.
Search Report for Chinese Application No. 201910049747.9, mailed May 27, 2023, 07 pages.
Alcatel-Lucent, Alcatel-Lucent Shanghai Bell., "Discussion on solutions for extended idle mode DRX" 3GPP TSG RAN WG2 Meeting #91 R2-153700, Beijing, China, Aug. 24-28, 2015.
Notice of the First Review Opinion dated Dec. 5, 2022, for Chinese Patent Application No. 201910049747.9 (18 pages).
The First Search Report dated Nov. 25, 2022, for Chinese Patent Application No. 201910049747.9 (six (6) pages).
International Search Report for the International Patent Application No. PCT/CN2020/071684, mailed Apr. 17, 2020, 2 pages.
Chinese Search Report for Application No. 2019100497479 dated Sep. 22, 2023.
Chinese Office Action for Application No. 2019100497479 dated Sep. 29, 2023.
3GPP TSG RAN WG2 Meeting #91, Beijing, China, Aug. 24-28, 2015.
3GPP TSG RAN WG2 NR AH Vancouver, Canada, Jan. 22-26, 2018.

* cited by examiner

TERMINAL ENERGY-SAVING METHOD, BASE STATION, TERMINAL, TERMINAL ENERGY-SAVING SYSTEM AND COMPUTER-READABLE STORAGE MEDIUM

CROSS-REFERENCE TO RELATED APPLICATIONS

This is a U.S. National Stage Application, filed under 35 U.S.C. 371, of International Patent Application No. PCT/CN2020/071684, filed on Jan. 13, 2020, which claims priority to Chinese Patent Application No. 201910049747.9 filed with the CNIPA on Jan. 18, 2019, the contents of which are incorporated herein by reference in their entireties.

TECHNICAL FIELD

The present application relates to the field of terminal energy-saving technologies and, exemplarily, to a terminal energy-saving method, a base station, a terminal, a terminal energy-saving system and a computer-readable storage medium.

BACKGROUND

Narrowband Internet of Things (NB-IoT) and/or enhanced Machine Type Communication (eMTC) are developed on the basis of Long-Term Evolution (LTE); accordingly, an NB-IoT base station and/or an eMTC base station can only access an Evolved Packet Core (EPC) network in the fourth generation of mobile communication technology (4G). However, with researches on the fifth generation of mobile communication technology (5G), the architecture of a core network changes and a 5G core (5GC) network is formed. The NB-IoT base station and/or the eMTC base station are expected to access the 5GC by taking advantage of the architectural advantages and flexibility of network deployment of the 5GC.

An NB-IoT terminal and/or an eMTC terminal have relatively high requirement on energy-saving; hence, the NB-IoT and/or the eMTC support User plane CIoT Evolved Packet System (EPS) optimization in context suspend state of idle state, and may enter Enhanced Discontinuous Reception (eDRX) and/or Power Saving Mode (PSM). A terminal or user equipment (UE) in the eDRX and/or the PSM may perform no radio quality measurement and/or no paging monitoring for a long time, thereby saving power consumption of the UE in the idle state. The UE context information such as security and bearers of the UE in the context suspend state of the idle state is stored in each of the UE, an evolved Node B (eNB) and a Mobility Management Entity (MME). When the UE switches from the idle state to a radio resource control (RRC) connection mode, RRC connection resume may be quickly performed without newly creating RRC connection; hence, the power consumption of the UE in a process switching from the idle state to the RRC connection mode can be saved.

However, at present, the 5GC does not support the context suspend state of the idle state, that is, the power consumption of the UE performing a user plane transmission when the NB-IoT terminal and/or the eMTC terminal access the 5GC will be higher than that of the UE when the NB-IoT terminal and/or the eMTC terminal access the EPC, which is unacceptable for the NB-IoT terminal and/or the eMTC terminal, which are sensitive to power consumption.

In addition, LTE and 5G terminals cannot enter the eDRX or the PSM when they are in an RRC-Inactive state, either. The LTE and 5G terminals with an energy-saving requirement also face the same problem, that is, either a UE context is released and the UE consumes a large amount of power consumption in a subsequent RRC setup stage, or the UE cannot enter the eDRX or the PSM when a context is suspended, so energy cannot be well saved.

SUMMARY

An embodiment of the present disclosure provides a terminal energy-saving method. The method includes:
  determining, by a base station, a first parameter of a user equipment (UE), where the first parameter includes at least one of a paging enhanced discontinuous reception (eDRX) parameter in an idle state or a deep sleep parameter in an idle state; and
  sending the first parameter.

An embodiment of the present disclosure further provides a terminal energy-saving method. The method includes:
  receiving, by a user equipment (UE), a first parameter, where the first parameter includes at least one of a paging enhanced discontinuous reception (eDRX) parameter in an idle state or a deep sleep parameter in an idle state;
  saving Energy according to the first parameter.

An embodiment of the present disclosure further provides a base station. The base station includes a determination unit and a sending unit.

The determination unit is configured to determine a first parameter of a user equipment (UE), where the first parameter includes at least one of a paging enhanced discontinuous reception (eDRX) parameter in an idle state or a deep sleep parameter in an idle state.

The sending unit is configured to send the first parameter.

An embodiment of the present disclosure further provides a terminal. The terminal includes a receiving unit and an energy-saving unit.

The receiving unit is configured to receive a first parameter, where the first parameter includes at least one of a paging enhanced discontinuous reception (eDRX) parameter in an idle state or a deep sleep parameter in an idle state.

The energy-saving unit is configured to save energy according to the first parameter.

An embodiment of the present disclosure further provides a base station. The base station includes a memory, a processor and a computer program stored in the memory and executable by the processor, where the computer program, when executed by the processor, implements the preceding terminal energy-saving method performed by the base station.

An embodiment of the present disclosure further provides a terminal. The terminal includes a memory, a processor and a computer program stored in the memory and executable by the processor, where the computer program, when executed by the processor, implements the preceding terminal energy-saving method performed by the terminal.

An embodiment of the present disclosure further provides a terminal energy-saving system. The system includes a base station and a terminal and further includes a core network maintaining a connection with the base station.

The core network is configured to negotiate with the base station about a maximum delay of a downlink data transmission or a maximum interval between downlink data retransmissions.

An embodiment of the present disclosure further provides a computer-readable storage medium. The computer-readable storage medium stores an information processing program which, when executed by a processor, implements any one of the preceding terminal energy-saving methods.

DETAILED DESCRIPTION

Embodiments of the present application are described hereinafter in detail with reference to drawings. It is to be noted that if not in collision, embodiments and features therein in the present application may be combined with each other in any manner.

The steps illustrated in the flowcharts among the drawings may be performed by a computer system such as a group of computers capable of executing instructions. Moreover, although logical sequences are illustrated in the flowcharts, the steps illustrated or described may be performed in sequences different from those described herein in some cases.

At present, a 5GC does not support a context suspend state of an idle state of a UE. Thus, for a UE that accesses the 5GC, a UE-specific connection of an Ng interface is maintained (the UE is in an RRC-connected state or an RRC-Inactive state (a context of a Uu interface between the UE and an eNB is suspended and the UE-specific connection of the Ng interface between the 5GC and the eNB is maintained)), the UE cannot enter an energy-saving mode such as eDRX and/or a PSM, and power consumption of the UE in the idle state is relatively wasteful. Alternatively, the UE-specific connection of the Ng interface is released and the context of the Uu interface between the UE and the eNB is also released. In this scenario, when the UE switches from the idle state to an RRC connection mode, RRC connection resume cannot be performed quickly, instead, an RRC connection needs to be newly created. Therefore, power consumption of the UE in a process switching from the idle state to the RRC connection mode is relatively large.

In addition, all terminals that support RRC INACTIVE, such as LTE and 5G terminals, cannot enter the eDRX or the PSM when they are in the RRC-Inactive state, either. The LTE and 5G terminals with an energy-saving requirement also face the same problem, that is, either a UE context is released and the UE consumes a large amount of power consumption in a subsequent RRC setup stage, or the UE cannot enter the eDRX or the PSM when a context is suspended, so energy cannot be well saved.

In embodiments of the present disclosure, a new terminal energy-saving scheme is provided, which enables the UE that accesses the 5GC to support an energy-saving mode in the idle state, thereby reducing the power consumption of the UE.

Figure 1:
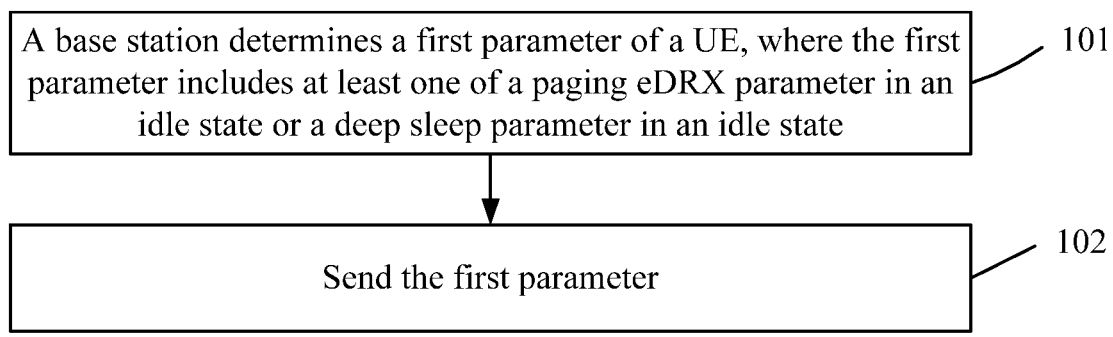
FIG. 1 is a flowchart of a terminal energy-saving method according to an embodiment of the present application.

FIG. 1 is a flowchart of a terminal energy-saving method according to an embodiment of the present application. As shown in FIG. 1, the method includes steps described below.

In step 101, a base station determines a first parameter of a UE, where the first parameter includes at least one of a paging eDRX parameter in an idle state or a deep sleep parameter in the idle state.

In step 102, the first parameter is sent.

Compared with related technique, in the embodiment of the present disclosure, a terminal energy-saving scheme is provided, which enables, by use of the first parameter, a UE that accesses a 5GC to support an energy-saving mode in the idle state, reducing power consumption of the UE.

In an embodiment, the paging eDRX parameter in the idle state includes a paging eDRX cycle or a paging eDRX interval, and a length of a paging time window (PTW) of the UE in one paging eDRX cycle.

The deep sleep parameter in the idle state includes a timer for determining that the UE enters a deep sleep mode and a maximum duration of the deep sleep mode of the UE.

In an embodiment, the step in which the base station determines the first parameter of the UE includes that the base station configures the first parameter or that the base station determines the first parameter according to a maximum interval between downlink data retransmissions received from a core network.

In an embodiment, after the first parameter is sent, the method further includes that in response to receiving downlink data for the UE, the base station processes the downlink data according to the first parameter and a second predefined rule.

In an embodiment, the second predefined rule includes at least one of rules described below.

In the case where the first parameter includes the paging eDRX parameter in the idle state and the UE is outside the PTW for paging eDRX, the base station buffers the downlink data and sends a paging message to the UE until the UE is within the PTW for paging eDRX.

In the case where the first parameter includes the deep sleep parameter in the idle state and the UE is in the deep sleep mode, the base station buffers the downlink data and sends a paging message to the UE until the UE is in a non-deep sleep mode.

In the case where the first parameter includes the paging eDRX parameter in the idle state and the deep sleep parameter in the idle state and the UE is outside the PTW for paging eDRX or in the deep sleep mode, the base station buffers the downlink data and sends a paging message to the UE until the UE is in a non-deep sleep mode and within the PTW for paging eDRX.

In an embodiment, the step of sending the paging message to the UE includes: determining, according to the first parameter, an occasion for initiating radio access network (RAN)-based paging to the UE, where an interval of the RAN-based paging is less than or equal to the maximum interval between downlink data retransmissions; and sending the paging message to the UE on the occasion.

In an embodiment, before or after the first parameter is sent, the method further includes that the base station negotiates with the core network about a maximum delay of a downlink data transmission or the maximum interval between downlink data retransmissions, and a connection between the base station and the core network is maintained.

In an embodiment, the step in which the base station negotiates with the core network about the maximum delay of the downlink data transmission or the maximum interval between downlink data retransmissions includes a step described below.

The base station pre-determines the maximum delay of the downlink data transmission and sends a UE-specific connection setup or resume request carrying the maximum delay of the downlink data transmission or the maximum interval between downlink data retransmissions to the core network;

alternatively, the base station receives a UE-specific connection setup or resume response carrying the maximum interval between downlink data retransmissions and sent by the core network;

alternatively, the base station determines the maximum delay of the downlink data transmission based on the first parameter configured and sends the maximum delay of the downlink data transmission or the maximum interval between downlink data retransmissions to the core network via dedicated signaling.

In an embodiment, in the case where the base station negotiates with the core network about the maximum delay of the downlink data transmission or the maximum interval between downlink data retransmissions before sending the first parameter, the first parameter needs to ensure that a duration for which the UE performs no paging monitoring is shorter than or equal to the maximum delay of the downlink data transmission or the maximum interval between downlink data retransmissions.

Figure 2:
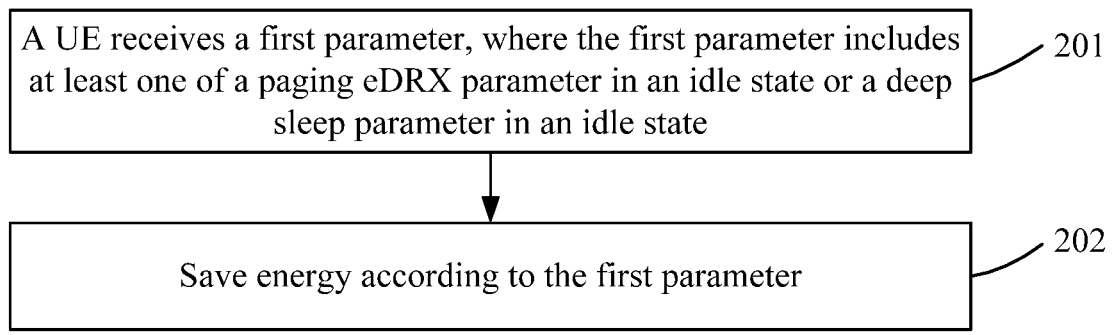
FIG. 2 is a flowchart of a terminal energy-saving method according to another embodiment of the present application.

FIG. 2 is a flowchart of a terminal energy-saving method according to another embodiment of the present application. As shown in FIG. 2, the method includes steps described below.

In step 201, a UE receives a first parameter, where the first parameter includes at least one of a paging eDRX parameter in an idle state or a deep sleep parameter in the idle state.

In step 202, energy is saved according to the first parameter.

In an embodiment, the paging eDRX parameter in the idle state includes a paging eDRX cycle or a paging eDRX interval, and a length of a paging time window (PTW) of the UE in one paging eDRX cycle.

The deep sleep parameter in the idle state includes a timer for determining that the UE enters a deep sleep mode and a maximum duration of the deep sleep mode of the UE.

In an embodiment, the step in which the UE receives the first parameter includes that the UE receives a radio resource control (RRC) connection release message, where the RRC connection release message carries the first parameter.

In an embodiment, the step in which the energy is saved according to the first parameter includes a step described below:

in the case where the first parameter includes the paging eDRX parameter in the idle state and the UE is in the idle state, paging monitoring is performed within the PTW configured in the paging eDRX parameter;

alternatively, in the case where the first parameter includes the deep sleep parameter in the idle state, radio quality measurement and paging monitoring are performed in response to the UE being in a normal mode in the idle state, and neither the radio quality measurement nor the paging monitoring is performed in response to the UE being in the deep sleep mode in the idle state;

alternatively, in the case where the first parameter includes the paging eDRX parameter in the idle state and the deep sleep parameter in the idle state and the UE is in a normal mode in the idle state, paging monitoring is performed within the PTW configured in the paging eDRX parameter.

In an embodiment, in the case where the first parameter includes the deep sleep parameter in the idle state, in response to a duration for which no user data and/or no signaling is sent or received being longer than a duration of the timer for determining that the UE enters the deep sleep mode, the UE in the normal mode in the idle state enters the deep sleep mode in the idle state; or in response to the existence of data sending requirement or a duration for which the UE is in the deep sleep mode being longer than the maximum duration of the deep sleep mode of the UE, the UE in the deep sleep mode enters the normal mode in the idle state.

In an embodiment, the method further includes a step described below. In the case where the UE is in the deep sleep mode and has uplink data to be sent, an RRC connection setup or resume request or an early data transmission (EDT) request is directly initiated to a base station.

Figure 3:
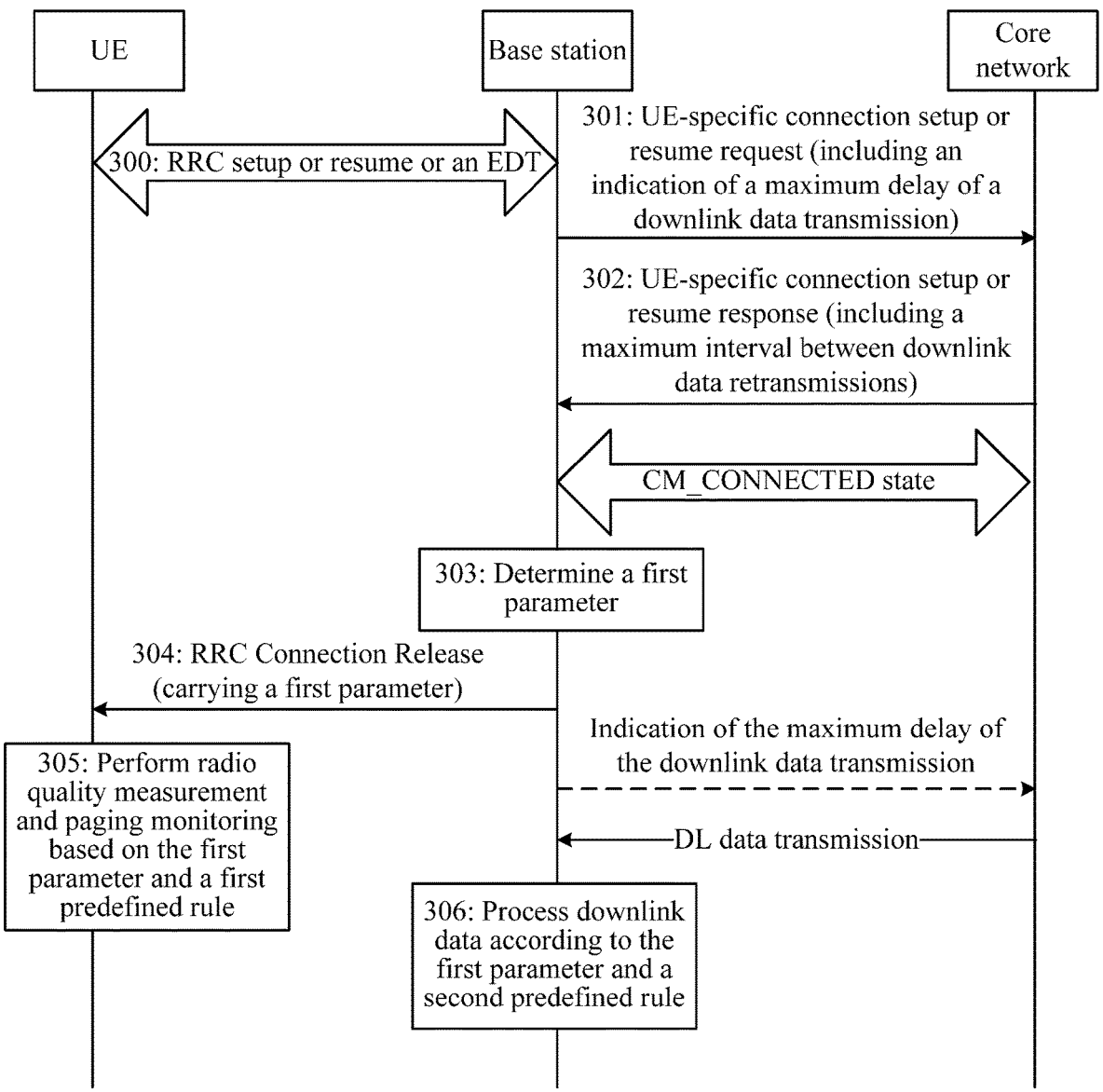
FIG. 3 is a flowchart of a terminal energy-saving method according to another embodiment of the present application.

FIG. 3 is a flowchart of a terminal energy-saving method according to another embodiment of the present application. As shown in FIG. 3, the method includes steps described below.

In step 300, a terminal initiates an RRC connection setup request, an RRC connection resume request or an EDT request to a base station to trigger an RRC connection setup process, an RRC connection resume process or an EDT process.

In the RRC connection setup process, the RRC connection resume process or the EDT process, a UE reports information for the base station to determine a first parameter to the base station. The information reported by the UE to the base station includes at least one of: a paging eDRX parameter in an idle state, a deep sleep parameter in the idle state, a data transmission cycle or a minimum interval between data transmissions. The UE may report the information to the base station through an uplink RRC message or a media access control control element (MAC-CE) accompanying the uplink RRC message. The UE reports the above parameters that may be used for an eNB to determine the configuration of eDRX and PSM parameters.

In step 301, the base station sends a UE-specific connection setup or resume request to a core network.

The base station may pre-determine a maximum delay of a downlink data transmission through an S1 or Ng interface and carry an indication of the maximum delay of the downlink data transmission or a maximum interval between downlink data retransmissions (a retransmission timer) in the UE-specific connection setup or resume request.

In step 302, the core network sends a UE-specific connection setup or resume response to the base station.

The maximum interval between downlink data retransmissions (the retransmission timer) may be carried in the UE-specific connection setup or resume response.

The core network ensures that an interval between downlink data packet retransmissions is greater than or equal to the maximum delay of the downlink data transmission or the maximum interval between downlink data retransmissions (a duration of the retransmission timer).

Through steps 301 and 302, a non-access stratum (NAS) is in a connection management (CM) CONNECTED state, a connection between the base station and the core network is maintained (a connection of the S1 or Ng interface is maintained), and the base station, the core network and the UE all store UE context information.

The base station may be a RAN device such as an eNB or a gNB, and the core network may be an EPC, a 5GC or the like.

In step 303, the base station determines the first parameter of the UE, that is, the paging eDRX parameter in the idle state and/or the deep sleep parameter in the idle state.

The base station may configure the first parameter of the UE by itself or may determine the first parameter of the UE according to the maximum interval between downlink data retransmissions (the retransmission timer) carried by the core network in the UE-specific connection setup or resume response.

The paging eDRX parameter in the idle state includes an eDRX cycle or an eDRX interval (a paging eDRX cycle), and a length of a paging time window (PTW) of the UE in one eDRX cycle. The length of the PTW uses a physical downlink control channel (PDCCH)-paging cycle (a DRX cycle) as a unit. The UE may determine a start position of the paging time window of the UE based on the eDRX cycle and a UE identification (ID) and determine an end position of the paging time window of the UE based on the start position of the paging time window of the UE and the length of the paging time window (PTW). The UE performs paging monitoring within the paging time window.

The deep sleep parameter in the idle state includes a timer for determining that the UE enters a deep sleep (ActiveTimer) and a maximum duration of the deep sleep of the UE (deep sleep mode (DSM) Timer). The UE determines, based on the deep sleep parameter in the idle state, whether it enters a deep sleep mode: for a UE in a normal mode in the idle state, if a duration for which no user data and/or no signaling are sent or received exceeds the ActiveTimer, the UE enters the deep sleep mode in the idle state; and if a UE has a data sending requirement or a duration for which the UE is in the deep sleep mode exceeds the DSM Timer, the UE enters the normal mode in the idle state. The UE in the normal mode in the idle state performs radio quality measurement and paging monitoring. The UE in the deep sleep mode in the idle state only maintains necessary timers and performs neither the radio quality measurement nor the paging monitoring.

If both the paging eDRX parameter in the idle state and the deep sleep parameter in the idle state are configured for the UE, the UE performs measurement and paging monitoring according to an eDRX parameter only in a non-deep sleep mode.

In addition, different from the preceding steps 301 to 303, the base station may preconfigure the first parameter, determine, based on the first parameter, the maximum delay of the downlink data transmission through the S1 or Ng interface (which is caused by factors such as untimely RAN-based paging), and send the maximum delay of the downlink data transmission through the S1 or Ng interface and/or the maximum interval between downlink data retransmissions (the retransmission timer) to the core network via dedicated signaling. If the base station sends the first parameter to the UE after sending the maximum delay of the downlink data transmission and/or the maximum interval between downlink data retransmissions to the core network, the first parameter needs to ensure that a duration for which the UE performs no paging monitoring cannot exceed the maximum delay of the downlink data transmission or the maximum interval between downlink data retransmissions (the retransmission timer). Alternatively, if the base station sends the first parameter to the UE after receiving the maximum interval between downlink data retransmissions which is sent by the core network, the first parameter needs to ensure that the duration for which the UE performs no paging monitoring cannot exceed the maximum delay of the downlink data transmission or the maximum interval between downlink data retransmissions (the retransmission timer).

In step 304, the base station sends an RRC connection release message to the UE, where the RRC connection release message carries the first parameter.

The base station may also send the indication of the maximum delay of the downlink data transmission to the core network after sending the RRC connection release message to the UE. That is, the base station determines, based on the configured eDRX parameter in the idle state and/or deep sleep parameter in the idle state, the maximum delay of the downlink data transmission through the S1 or Ng interface (which is caused by factors such as the untimely RAN-based paging) and sends the maximum delay of the downlink data transmission through the S1 or Ng interface or the maximum interval between downlink data retransmissions (the retransmission timer) through the S1 or Ng interface to the core network via the dedicated signaling.

In step 305, the UE performs the radio quality measurement and the paging monitoring based on the first parameter and a first predefined rule.

After receiving the RRC connection release message, the UE enters a context suspend state of the idle state or an RRC-Inactive state.

The first predefined rule includes at least one of rules described below.

1. When the first parameter includes the eDRX parameter in the idle state, the UE performs the paging monitoring only within the paging time window configured in the eDRX parameter.

2. When the first parameter includes the deep sleep parameter in the idle state, the UE in the normal mode in the idle state performs the radio quality measurement and the paging monitoring; and the UE in the deep sleep mode in the idle state only maintains the necessary timers (such as the timer for determining that the UE enters the deep sleep (ActiveTimer) and a timer for the maximum duration of the deep sleep of the UE (DSM Timer)) and performs neither the radio quality measurement nor the paging monitoring.

After receiving the RRC connection release message, the UE enters the idle state. In the embodiment, the idle state is divided into the normal mode and the deep sleep mode. The normal mode in the idle state means that the UE releases an RRC connection, enters the idle state, and performs the radio quality measurement and the paging monitoring according to eDRX. That is, the UE in the normal mode in the idle state performs the radio quality measurement and the paging monitoring. The deep sleep mode in the idle state means that the UE enters the deep sleep, only maintains the necessary timers, and performs neither the radio quality measurement nor the paging monitoring.

3. When the first parameter includes the eDRX parameter in the idle state and the deep sleep parameter in the idle state, the UE performs the measurement and the paging monitoring according to the eDRX parameter only in the non-deep sleep mode (the normal mode in the idle state); and the UE in the deep sleep mode in the idle state only maintains the necessary timers (such as the timer for determining that the UE enters the deep sleep (ActiveTimer) and the timer for the maximum duration of the deep sleep of the UE (DSM Timer)) and performs neither the radio quality measurement nor the paging monitoring.

In step 306, after sending the RRC connection release message to the UE, the base station processes downlink data according to the first parameter and a second predefined rule.

The second predefined rule includes at least one of rules described below.

1. When the first parameter includes the eDRX parameter in the idle state, if the base station, the eNB, receives the downlink data sent by the core network and the UE is in an inActive Paging Occasion monitoring state (outside the PTW for paging eDRX), the base station buffers the downlink data and sends a paging message to the UE until the UE is on an Active Paging Occasion (within the PTW for paging eDRX), so as to trigger RRC connection setup or resume or an EDT.

2. When the first parameter includes the deep sleep parameter in the idle state, if the base station, the eNB, receives the downlink data sent by the core network and the UE is in the inActive Paging Occasion monitoring state (in the DSM), the base station buffers the downlink data and sends the paging message to the UE until the UE is on an Active Paging Occasion (in the non-deep sleep mode, that is, the normal mode in the idle state), so as to trigger the RRC connection setup or resume or the EDT.

3. When the first parameter includes the eDRX parameter in the idle state and the deep sleep parameter in the idle state, if the base station, the eNB, receives the downlink data sent by the core network and the UE is in the inActive Paging Occasion monitoring state (outside the PTW for paging eDRX or in the DSM), the base station buffers the downlink data and sends the paging message to the UE until the UE is on an Active Paging Occasion (within the PTW for paging eDRX), so as to trigger the RRC connection setup or resume or the EDT.

Figure 4:
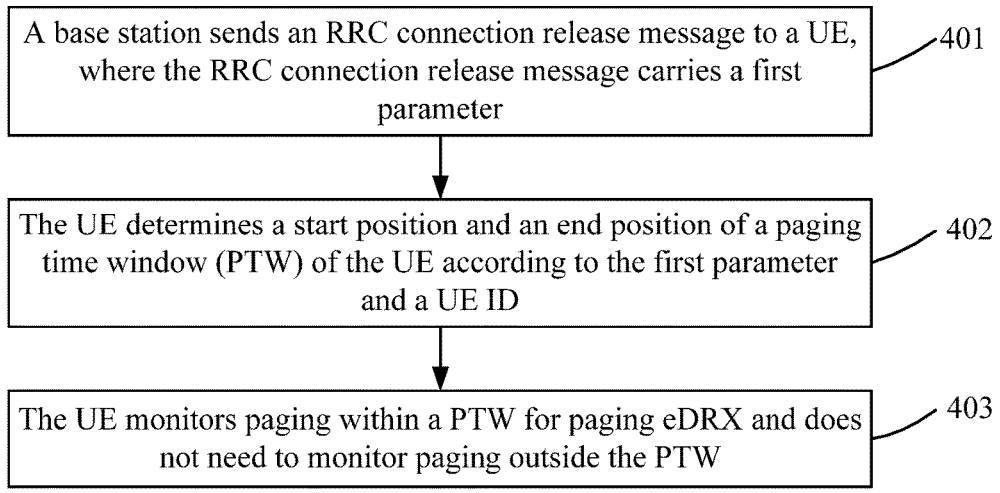
FIG. 4 is a flowchart of a terminal energy-saving method according to another embodiment of the present application.

FIG. 4 is a flowchart of a terminal energy-saving method according to another embodiment of the present application. As shown in FIG. 4, the method includes steps described below.

In step 401, a base station sends an RRC connection release message to a UE, where the RRC connection release message carries a first parameter.

In the embodiment, the first parameter includes an eDRX parameter in an idle state. The eDRX parameter in the idle state includes at least an eDRX cycle or an eDRX interval (a paging eDRX cycle), and a length of a paging time window (PTW) of the UE in one eDRX cycle. The length of the PTW uses a PDCCH-paging cycle (DRX cycle) as a unit.

The RRC connection release message is used for instructing the UE to enter an RRC-Inactive state or a context suspend state of the idle state. The UE releases an RRC connection and corresponding radio resources according to the received RRC connection release message; however, UE context information is stored and a connection between the base station of the UE and a core network is maintained.

In step 402, the UE determines a start position and an end position of the paging time window (PTW) of the UE according to the first parameter and a UE ID.

A rule for determining the start position and the end position of the paging time window (PTW) of the UE includes a rule described below.

1. A hyper-system frame number (H-SFN) where the start position of the paging time window is located is determined based on that H-SFN mod T paging eDRX=UE-ID mod T paging eDRX, where the T paging eDRX is a paging eDRX cycle, and the UE-ID may be a serving-temporary mobile subscriber identity (S-TMSI) or an international mobile subscriber identification number (IMSI) of the UE or the like.

2. A position of a first paging occasion (PO) of the UE in the H-SFN is the start position of the paging time window (PTW).

3. The end position of the paging time window (PTW) is the start position of the paging time window (PTW) plus the length of the paging time window (PTW).

In addition, the start and end positions of the PTW may also be determined using a paging eDRX-related policy of an NAS.

In step 403, the UE monitors paging within the PTW for paging eDRX and does not need to monitor paging outside the PTW.

Figure 5A:
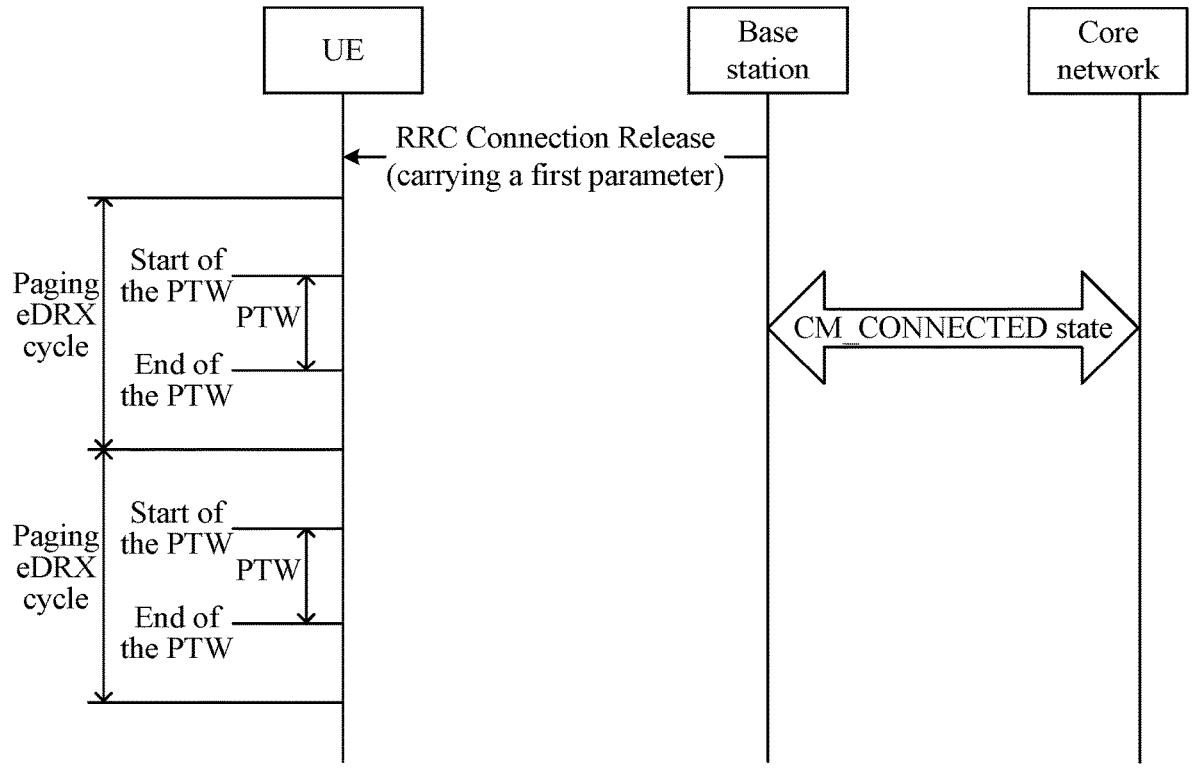
FIG. 5A is a schematic diagram in the non-existence of downlink data according to an embodiment of the present disclosure.

The paging eDRX cycle and the PTW in the paging eDRX cycle appear periodically. When the core network does not send downlink data to an eNB, the eNB does not need to send paging to the UE, either, as shown in FIG. 5A.

Figure 5B:
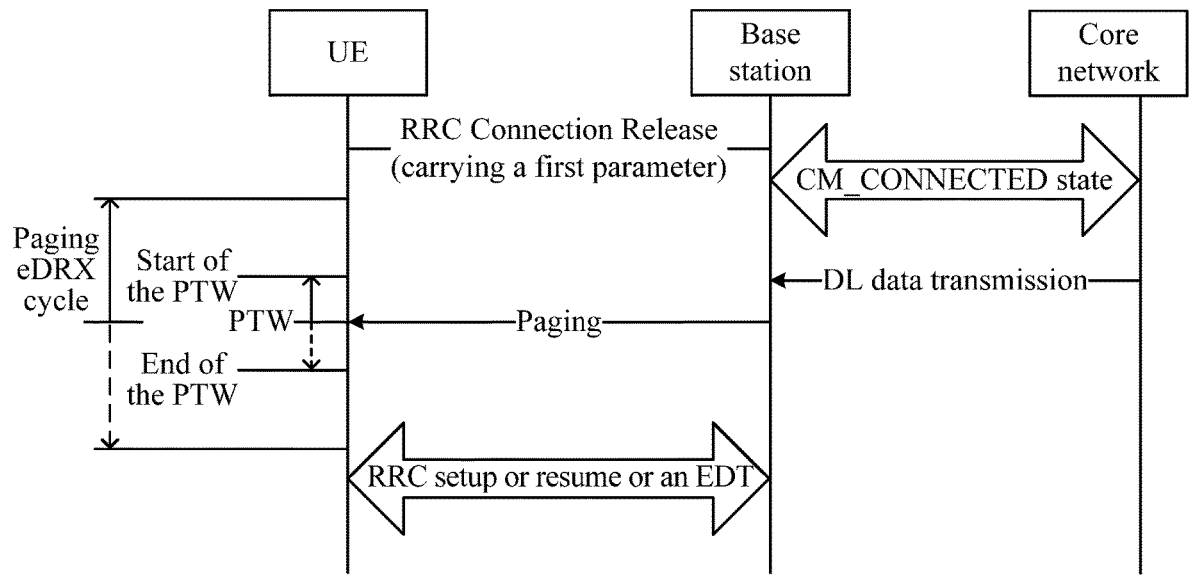
FIG. 5B is a schematic diagram in the existence of downlink data according to an embodiment of the present disclosure.

The paging eDRX cycle and the PTW in the paging eDRX cycle appear periodically. When an occasion on which the core network sends the downlink data to the eNB falls outside the PTW for paging eDRX, the eNB buffers the downlink data and sends paging to the UE within a PTW when the PTW comes, so as to trigger RRC connection setup or resume or an EDT, as shown in FIG. 5B.

Figure 5C:
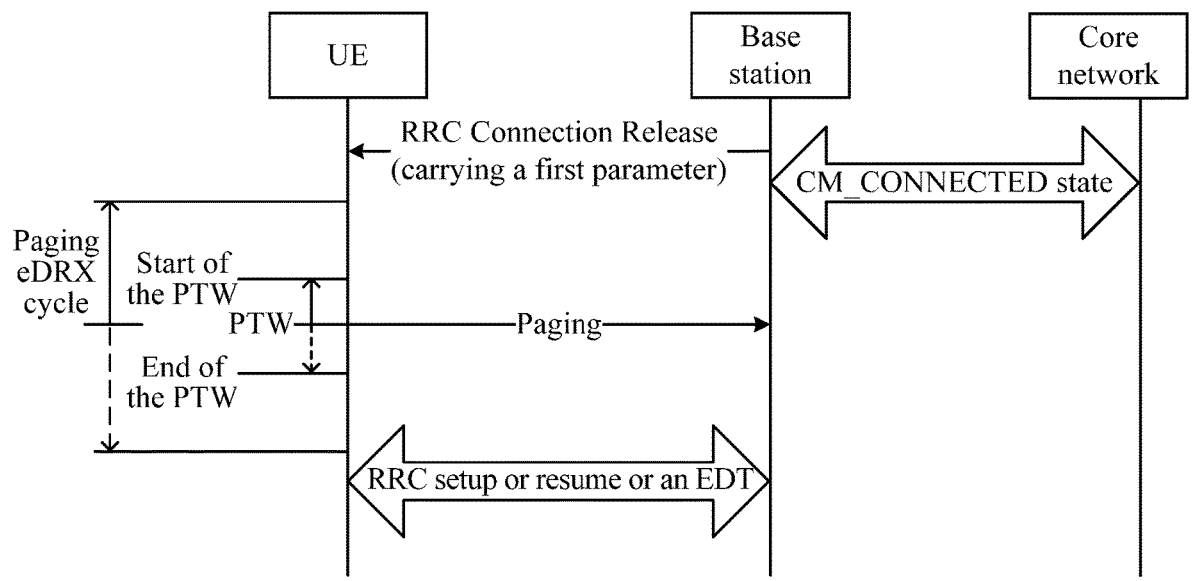
FIG. 5C is a schematic diagram in the existence of uplink data according to an embodiment of the present disclosure.

The paging eDRX cycle and the PTW in the paging eDRX cycle appear periodically. When the UE is in the idle state and has uplink data to be sent, for example, within the PTW, the RRC connection setup or resume or the EDT is directly triggered, as shown in FIG. 5C.

Figure 6:
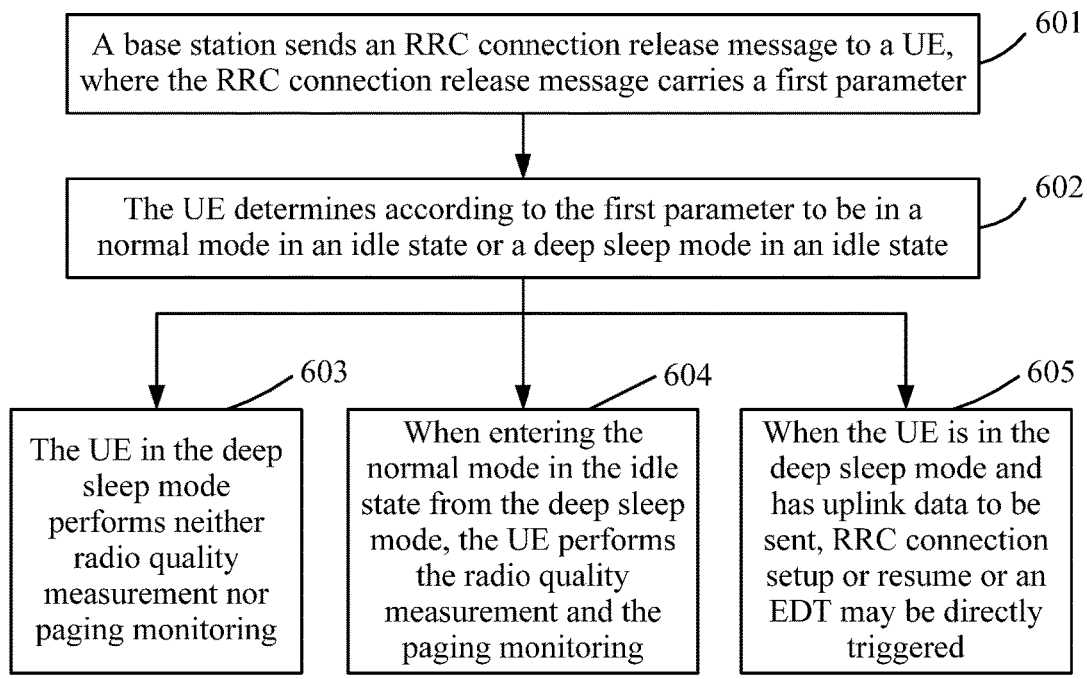
FIG. 6 is a flowchart of a terminal energy-saving method according to another embodiment of the present application.

FIG. 6 is a flowchart of a terminal energy-saving method according to another embodiment of the present application. As shown in FIG. 6, the method includes steps described below.

In step 601, a base station sends an RRC connection release message to a UE, where the RRC connection release message carries a first parameter.

In the embodiment, the first parameter includes a deep sleep parameter in an idle state. The deep sleep parameter in the idle state at least includes a timer for determining that the UE enters a deep sleep (ActiveTimer) and a maximum duration of the deep sleep of the UE (DSM Timer).

The RRC connection release message is used for instructing the UE to enter an RRC-Inactive state or a context suspend state of the idle state. The UE releases an RRC connection and corresponding radio resources according to the received RRC connection release message; however, UE context information is stored and a connection between the base station of the UE and a core network is maintained.

In step 602, the UE determines according to the first parameter to be in a normal mode in the idle state or a deep sleep mode in the idle state.

The step of determining to be in the normal mode in the idle state or the deep sleep mode in the idle state includes steps described below.

1. For a UE in the normal mode in the idle state, if a duration for which no user data and/or no signaling is sent or received exceeds the ActiveTimer, the UE enters the deep sleep mode in the idle state.

The normal mode in the idle state means that the UE releases the RRC connection, enters the idle state, and performs radio quality measurement and paging monitoring. The deep sleep mode in the idle state means that the UE enters the deep sleep, only maintains necessary timers, and performs neither the radio quality measurement nor the paging monitoring.

2. For a UE in the deep sleep mode in the idle state, if the UE has a data sending requirement or a duration for which the UE is in the deep sleep mode exceeds the DSM Timer, the UE enters the normal mode in the idle state.

Figure 7A:
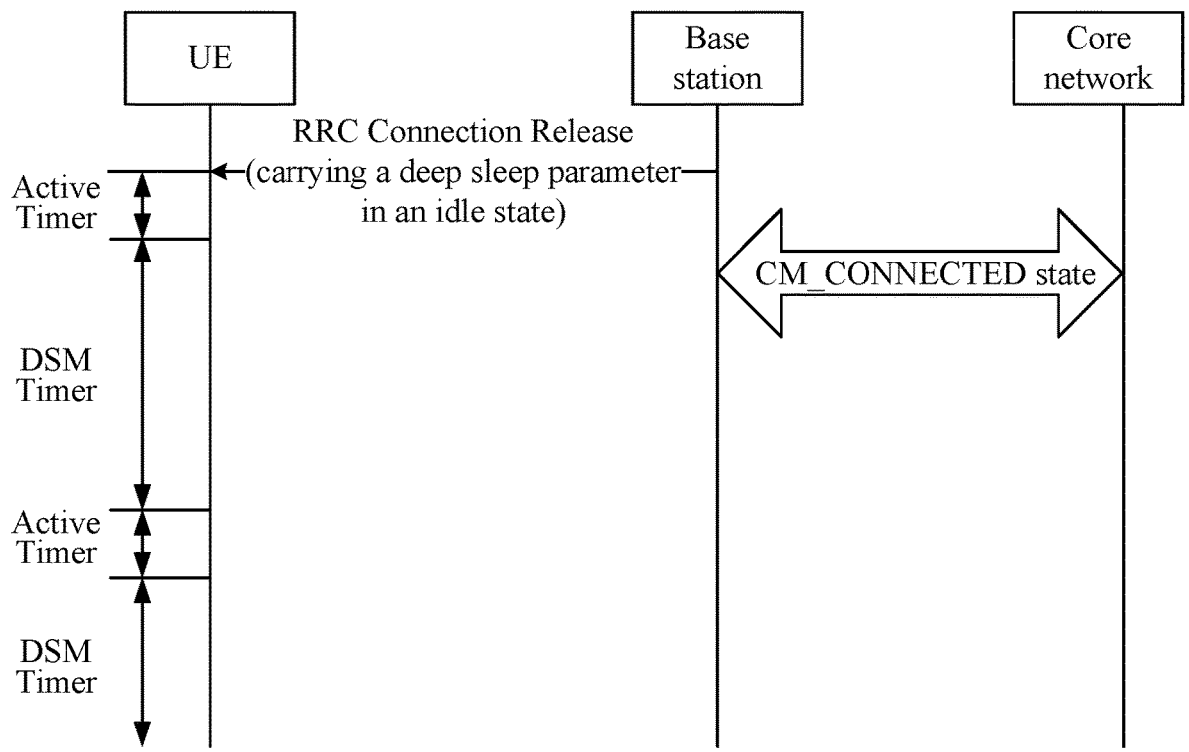
FIG. 7A is a schematic diagram in the non-existence of downlink data according to an embodiment of the present disclosure.
Figure 7B:
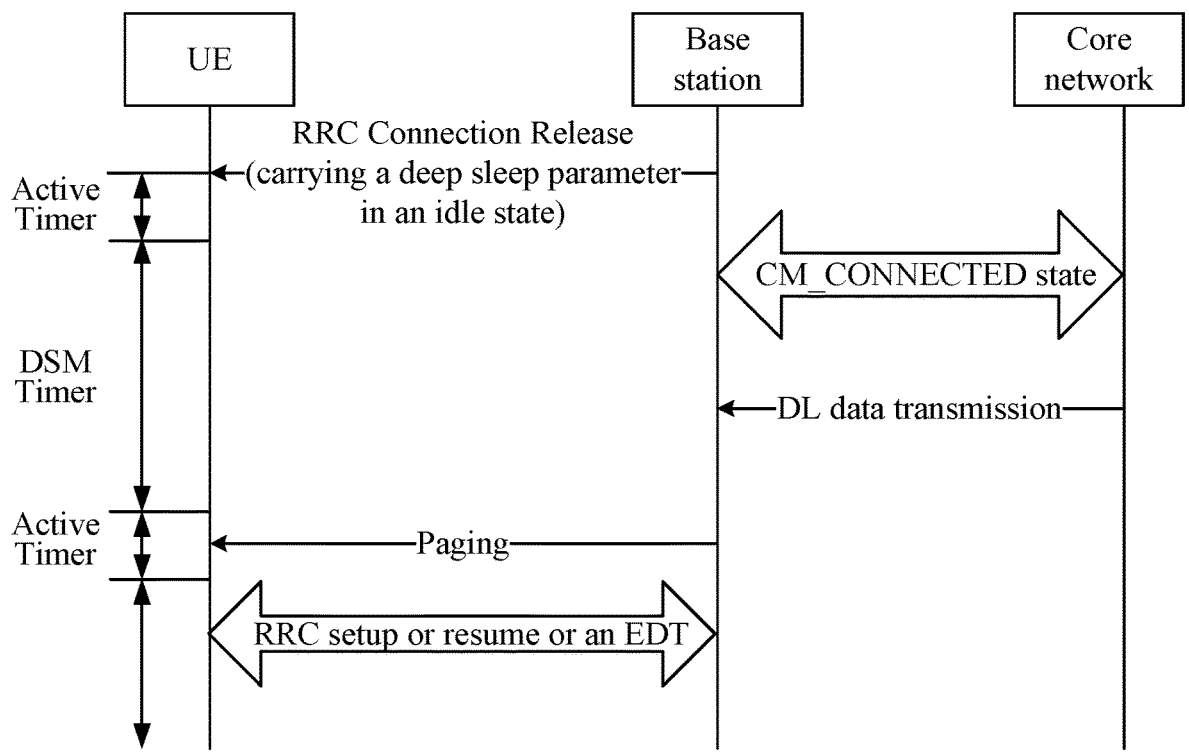
FIG. 7B is a schematic diagram in the existence of downlink data according to an embodiment of the present disclosure.
Figure 7C:
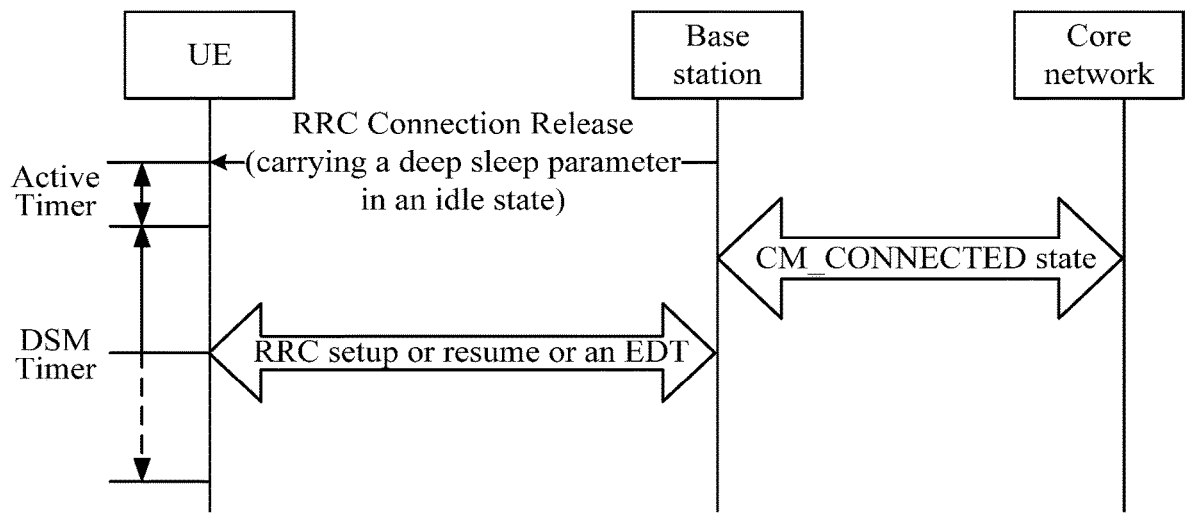
FIG. 7C is a schematic diagram in the existence of uplink data according to an embodiment of the present disclosure.

The normal mode in the idle state (when the ActiveTimer runs) and the deep sleep mode in the idle state (when the DSM Timer runs) appear periodically. When the core network does not send downlink data to an eNB, the eNB does not need to send paging to the UE, as shown in FIG. 7A. When the core network sends the downlink data to the base station while the UE is in the deep sleep mode, the base station buffers the downlink data and sends a paging message to the UE until the UE is in the normal mode in the idle state, so as to trigger RRC connection setup or resume or an EDT, as shown in FIG. 7B. When the UE in the deep sleep mode has uplink data to be sent, the RRC connection setup or resume or the EDT may be directly triggered, as shown in FIG. 7C.

In step 603, the UE in the deep sleep mode performs neither the radio quality measurement nor the paging monitoring.

When entering the deep sleep mode, the UE needs to maintain the DSM Timer.

In step 604, when entering the normal mode in the idle state from the deep sleep mode, the UE performs the radio quality measurement and the paging monitoring.

If the UE exits from the deep sleep mode, the UE enters the normal mode in the idle state and performs the radio quality measurement and the paging monitoring.

In step 605, when the UE is in the deep sleep mode and has uplink data to be sent, the RRC connection setup or resume or the EDT may be directly triggered.

When the UE is in the normal mode in the idle state and has uplink data to be sent, the RRC connection setup or resume or the EDT may also be directly triggered.

There is no fixed sequence for the above-described steps 603 to 605.

Figure 8:
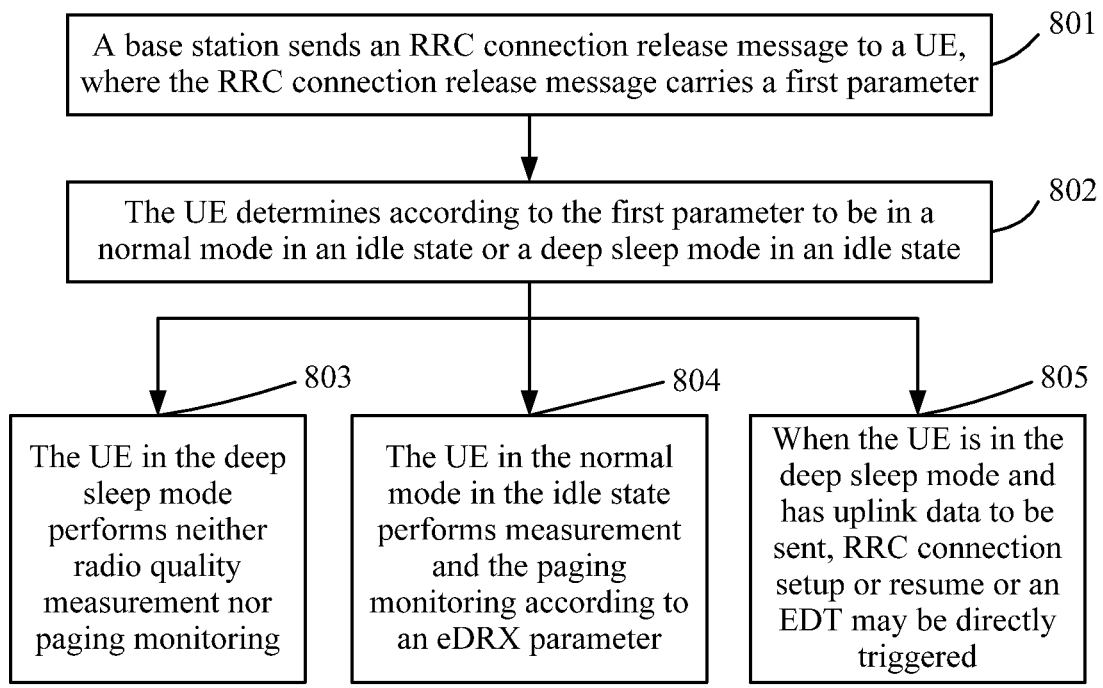
FIG. 8 is a flowchart of a terminal energy-saving method according to another embodiment of the present application.

FIG. 8 is a flowchart of a terminal energy-saving method according to another embodiment of the present application. As shown in FIG. 8, the method includes steps described below.

In step 801, a base station sends an RRC connection release message to a UE, where the RRC connection release message carries a first parameter.

In the embodiment, the first parameter includes an eDRX parameter in an idle state and a deep sleep parameter in an idle state. The deep sleep parameter in the idle state at least includes a timer for determining that the UE enters a deep sleep (ActiveTimer) and a maximum duration of the deep sleep of the UE (DSM Timer). A paging eDRX parameter in the idle state at least includes a paging eDRX cycle or an eDRX interval (a paging eDRX cycle), and a length of a paging time window (PTW) of the UE in one paging eDRX cycle. The length of the PTW uses a PDCCH-paging cycle (DRX cycle) as a unit.

The RRC connection release message is used for instructing the UE to enter an RRC-Inactive state or a context suspend state of the idle state. The UE releases an RRC connection and corresponding radio resources after receiving the RRC connection release message; however, UE context information is stored and a connection between the base station of the UE and a core network is maintained.

In step 802, the UE determines according to the first parameter to be in a normal mode in the idle state or a deep sleep mode in the idle state.

The step of determining to be in the normal mode in the idle state or the deep sleep mode in the idle state includes steps described below.

1. For a UE in the normal mode in the idle state, if a duration for which no user data and/or no signaling is sent or received exceeds the ActiveTimer, the UE enters the deep sleep mode in the idle state.

The normal mode in the idle state means that the UE releases the RRC connection, enters the idle state, and performs radio quality measurement and paging monitoring. The deep sleep mode in the idle state means that the UE enters the deep sleep, only maintains necessary timers, and performs neither the radio quality measurement nor the paging monitoring.

2. For a UE in the deep sleep mode in the idle state, if the UE has a data sending requirement or a duration for which the UE is in the deep sleep mode exceeds the DSM Timer, the UE enters the normal mode in the idle state.

The normal mode in the idle state (when the ActiveTimer runs) and the deep sleep mode in the idle state (when the DSM Timer runs) appear periodically. When the core network does not send downlink data to an eNB, the eNB does not need to send paging to the UE. When the core network sends the downlink data to the base station while the UE is in the deep sleep mode, the base station buffers the downlink data and sends a paging message to the UE until the UE is in the normal mode (that is, a non-deep sleep mode) in the idle state and within the paging time window (PTW), so as to trigger RRC connection setup or resume or an EDT. When the UE in the deep sleep mode has uplink data to be sent, the RRC connection setup or resume or the EDT may be directly triggered.

In step 803, the UE in the deep sleep mode performs neither the radio quality measurement nor the paging monitoring.

When entering the deep sleep mode, the UE needs to maintain the DSM Timer.

In step 804, the UE in the normal mode in the idle state performs the radio quality measurement and the paging monitoring according to the eDRX parameter.

In step 805, when the UE is in the deep sleep mode and has the uplink data to be sent, the RRC connection setup or resume or the EDT may be directly triggered.

When the UE is in the normal mode in the idle state and has the uplink data to be sent, the RRC connection setup or resume or the EDT may also be directly triggered.

There is no fixed sequence for the above-described steps 803 to 805.

Figure 9:
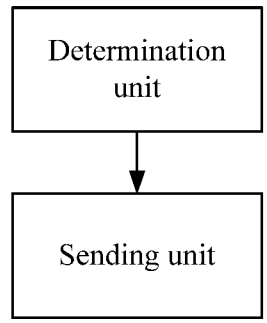
FIG. 9 is a structure diagram of a base station according to another embodiment of the present application.

FIG. 9 is a structure diagram of a base station according to another embodiment of the present application. As shown in FIG. 9, the base station includes a determination unit and a sending unit.

The determination unit is configured to determine a first parameter of a UE, where the first parameter includes at least one of a paging enhanced discontinuous reception (eDRX) parameter in an idle state or a deep sleep parameter in an idle state.

The sending unit is configured to send the first parameter.

The paging eDRX parameter in the idle state includes a paging eDRX cycle or a paging eDRX interval, and a length of a paging time window (PTW) of the UE in one paging eDRX cycle.

The deep sleep parameter in the idle state includes a timer for determining that the UE enters a deep sleep mode and a maximum duration of the deep sleep mode of the UE.

The determination unit is configured to configure the first parameter, or determine the first parameter according to a maximum interval between downlink data retransmissions which is received from a core network.

The base station further includes a processing unit.

The processing unit is configured to: in response to the base station receiving downlink data for the UE, process the downlink data according to the first parameter and a second predefined rule.

The second predefined rule includes at least one of rules described below.

In the case where the first parameter includes the paging eDRX parameter in the idle state and the UE is outside the PTW for paging eDRX, the base station buffers the downlink data and sends a paging message to the UE until the UE is within the PTW for paging eDRX.

In the case where the first parameter includes the deep sleep parameter in the idle state and the UE is in the deep sleep mode, the base station buffers the downlink data and sends a paging message to the UE until the UE is in a non-deep sleep mode.

In the case where the first parameter includes the paging eDRX parameter in the idle state and the deep sleep parameter in the idle state and the UE is outside the PTW for paging eDRX or in the deep sleep mode, the base station buffers the downlink data and sends a paging message to the UE until the UE is in a non-deep sleep mode and within the PTW for paging eDRX.

The operation of sending the paging message to the UE includes operations described below. An occasion for initiating radio access network (RAN)-based paging to the UE is determined according to the first parameter, where an interval of the RAN-based paging is less than or equal to the maximum interval between downlink data retransmissions. The paging message is sent to the UE on the occasion.

The base station further includes a negotiation unit. The negotiation unit is configured to: before or after the first parameter is sent, negotiate with the core network about a maximum delay of a downlink data transmission or the maximum interval between downlink data retransmissions, where a connection between the base station and the core network is maintained.

The negotiation unit is configured to pre-determine the maximum delay of the downlink data transmission and send a UE-specific connection setup or resume request carrying the maximum delay of the downlink data transmission or the maximum interval between downlink data retransmissions to the core network.

Alternatively, the negotiation unit is configured to receive a UE-specific connection setup or resume response carrying the maximum interval between downlink data retransmissions, which is sent by the core network.

Alternatively, the negotiation unit is configured to determine the maximum delay of the downlink data transmission based on the first parameter configured and send the maximum delay of the downlink data transmission or the maximum interval between downlink data retransmissions to the core network via dedicated signaling.

In the case where the negotiation unit negotiates with the core network about the maximum delay of the downlink data transmission or the maximum interval between downlink data retransmissions before the first parameter is sent, the first parameter needs to ensure that a duration for which the UE performs no paging monitoring is shorter than or equal to the maximum delay of the downlink data transmission or the maximum interval between downlink data retransmissions.

Figure 10:
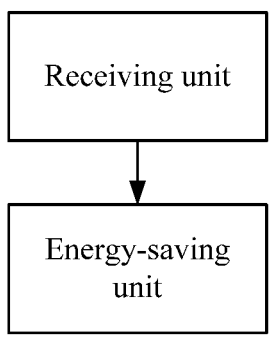
FIG. 10 is a structure diagram of a terminal according to another embodiment of the present application.

FIG. 10 is a structure diagram of a terminal according to another embodiment of the present application. As shown in FIG. 10, the terminal includes a receiving unit and an energy-saving unit.

The receiving unit is configured to receive a first parameter, where the first parameter includes at least one of a paging enhanced discontinuous reception (eDRX) parameter in an idle state or a deep sleep parameter in an idle state.

The energy-saving unit is configured to save energy according to the first parameter.

The paging eDRX parameter in the idle state includes a paging eDRX cycle or a paging eDRX interval, and a length of a paging time window (PTW) of a UE in one paging eDRX cycle.

The deep sleep parameter in the idle state includes a timer for determining that the UE enters a deep sleep mode and a maximum duration of the deep sleep mode of the UE.

The receiving unit is configured to receive a radio resource control (RRC) connection release message, where the RRC connection release message carries the first parameter.

The energy-saving unit is configured to: in the case where the first parameter includes the paging eDRX parameter in the idle state and the UE is in the idle state, perform paging monitoring within the PTW configured in the paging eDRX parameter.

Alternatively, the energy-saving unit is configured to: in the case where the first parameter includes the deep sleep parameter in the idle state, perform radio quality measurement and paging monitoring in response to the UE being in a normal mode in the idle state and perform neither the radio quality measurement nor the paging monitoring in response to the UE being in the deep sleep mode in the idle state.

Alternatively, the energy-saving unit is configured to: in the case where the first parameter includes the paging eDRX parameter in the idle state and the deep sleep parameter in the idle state and the UE is in a normal mode in the idle state, perform paging monitoring within the PTW configured in the paging eDRX parameter.

In the case where the first parameter includes the deep sleep parameter in the idle state, in response to a duration for which no user data and/or no signaling is sent or received being longer than a duration of the timer for determining that the UE enters the deep sleep mode, the UE in the normal mode in the idle state enters the deep sleep mode in the idle state; or in response to the existence of a data sending requirement or a duration for which the UE is in the deep sleep mode being longer than the maximum duration of the deep sleep mode of the UE, the UE in the deep sleep mode in the idle state enters the normal mode in the idle state.

The terminal further includes a processing unit. The processing unit is configured to: in the case where the UE is in the deep sleep mode and has uplink data to be sent, directly initiate an RRC connection setup or resume request or an early data transmission (EDT) request to a base station.

Figure 11A:
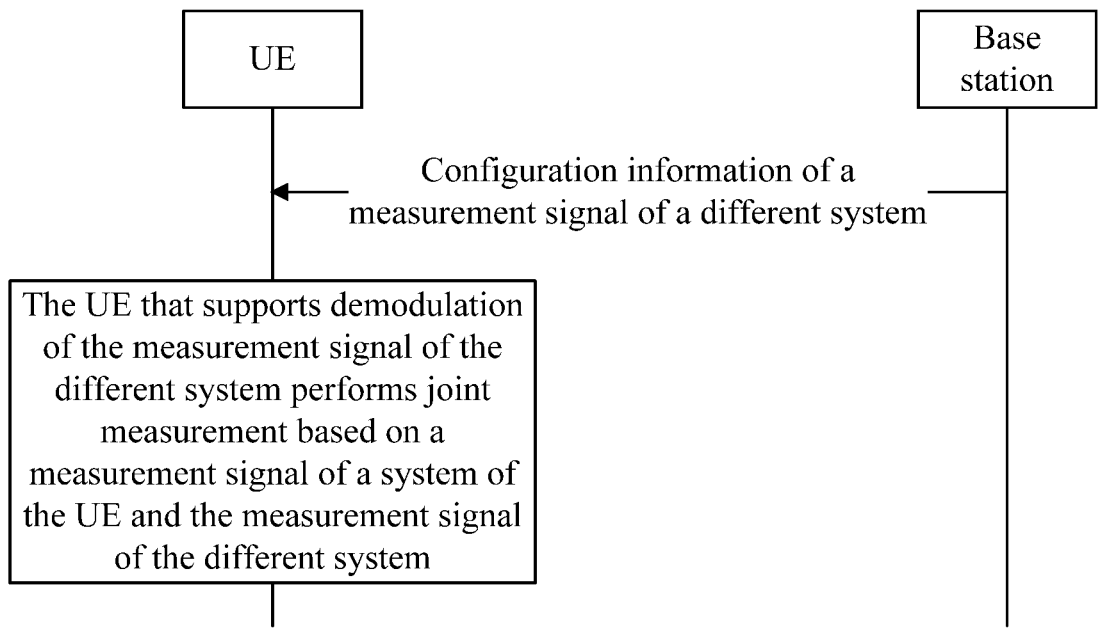
FIG. 11A is a flowchart of joint measurement according to another embodiment of the present application.

In another embodiment of the present application, as shown in FIG. 11A, a base station sends configuration information of a measurement signal of a different system to a user equipment (UE). For example, the configuration information of the measurement signal of the different system may be transferred by using a system information block (SIB). The UE that supports demodulation of the measurement signal of the different system jointly performs radio quality measurement such as reference signal receiving power (RSRP)/reference signal receiving quality (RSRQ) for a cell of the UE and/or a neighbor cell based on a measurement signal of a system of the UE and the measurement signal of the different system.

Figure 11B:
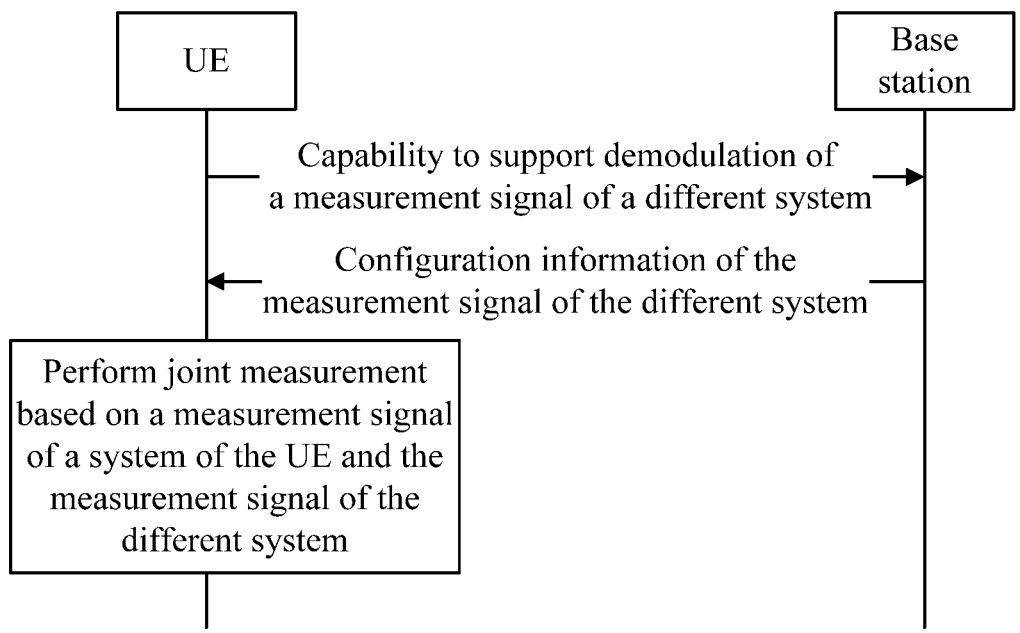
FIG. 11B is a flowchart of joint measurement according to another embodiment of the present application.

In another embodiment of the present application, as shown in FIG. 11B, a UE reports to a base station a capability to support demodulation of a measurement signal of a different system; and the base station sends configuration information of the measurement signal of the different system to the UE. For example, the configuration information of the measurement signal of the different system may be transferred by using RRC dedicated signaling. The UE jointly performs radio quality measurement such as RSRP/RSRQ for a cell of the UE and/or a neighbor cell based on a measurement signal of a system of the UE and the measurement signal of the different system.

The different system refers to any one or more of an NB-IoT system, an eMTC system, an LTE system or a New Radio (NR) system, which are different from the system of the UE.

The configuration information of the measurement signal of the different system includes information about a measurement signal of at least one other system, which may be any one of the NB-IoT system, the eMTC system, the LTE system or the NR system. A measurement signal of the NB-IoT system includes at least one of a narrowband reference signal (NRS), a narrowband primary synchronization signal (NPSS) or a narrowband secondary synchronization signal (NSSS). A measurement signal of the eMTC/LTE system includes at least one of a cell-specific reference signal (CRS), a primary synchronization signal (PSS), a secondary synchronization signal (SSS) or a discovery signal (DS). A measurement signal of the NR system includes at least one of a channel state information-reference signal (CSI-RS), a primary synchronization signal (PSS) or a secondary synchronization signal (SSS).

The configuration information of the measurement signal of the different system includes at least one of: a measurement activation indication based on the measurement signal of the different system, information about transmit power (absolute power or a power offset based on a certain measurement signal of the system of the UE) of the measurement signal of the different system, or information about a time domain/frequency domain position of the measurement signal of the different system.

An embodiment of the present disclosure further provides a base station. The base station includes a memory, a processor and a computer program stored in the memory and executable by the processor, where the computer program, when executed by the processor, implements any one of the preceding terminal energy-saving methods performed by the base station.

An embodiment of the present disclosure further provides a terminal. The terminal includes a memory, a processor and a computer program stored in the memory and executable by the processor, where the computer program, when executed by the processor, implements any one of the preceding terminal energy-saving methods performed by the terminal.

An embodiment of the present disclosure further provides a terminal energy-saving system. The system includes any one of the preceding base stations and any one of the preceding terminals and further includes a core network maintaining a connection with the base station.

The core network is configured to negotiate with the base station about a maximum delay of a downlink data transmission or a maximum interval between downlink data retransmissions.

An embodiment of the present disclosure further provides a computer-readable storage medium. The computer-readable storage medium stores an information processing program which, when executed by a processor, implements steps of any one of the preceding terminal energy-saving methods.

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding functional modules/units may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic disk or other magnetic storage devices, or any other medium that can be used for storing desired information and that can be accessed by a computer. Moreover, as is known to those having ordinary skill in the art, the communication media generally include computer-readable instructions, data structures, program modules or other data in carriers or in modulated data signals transported in other transport mechanisms, and may include any information delivery medium.

What is claimed is:

1. A terminal energy-saving method, comprising:
   determining, by a base station, a first parameter of a user equipment (UE), wherein the first parameter comprises at least one of a paging enhanced discontinuous reception (eDRX) parameter or a deep sleep parameter; and
   sending the first parameter, wherein before or after sending the first parameter, the method further comprises:

negotiating, by the base station, with a core network about a maximum delay of a downlink data transmission or a maximum interval between downlink data retransmissions, and maintaining a connection between the base station and the core network.

2. The method according to claim 1, wherein
the paging eDRX parameter comprises a paging eDRX cycle or a paging eDRX interval, and a length of a paging time window (PTW) of the UE in one paging eDRX cycle; and
the deep sleep parameter comprises a timer for determining that the UE enters a deep sleep mode and a maximum duration of the deep sleep mode of the UE.

3. The method according to claim 2, after sending the first parameter, further comprising:
in response to receiving downlink data for the UE, processing, by the base station, the downlink data according to the first parameter and a second predefined rule.

4. The method according to claim 3, wherein the second predefined rule comprises at least one of the following:
in a case where the first parameter comprises the paging eDRX parameter and the UE is outside the PTW for paging eDRX, the base station buffers the downlink data and sends a paging message to the UE until the UE is within the PTW for paging eDRX;
in a case where the first parameter comprises the deep sleep parameter in the idle state and the UE is in the deep sleep mode, the base station buffers the downlink data and sends a paging message to the UE until the UE is in a non-deep sleep mode; or
in a case where the first parameter comprises the paging eDRX parameter and the deep sleep parameter and the UE is outside the PTW for paging eDRX or in the deep sleep mode, the base station buffers the downlink data and sends a paging message to the UE until the UE is in a non-deep sleep mode and within the PTW for paging eDRX.

5. The method according to claim 4, wherein sending the paging message to the UE comprises:
determining an occasion for initiating radio access network (RAN)-based paging to the UE according to the first parameter, wherein an interval of the RAN-based paging is less than or equal to a maximum interval between downlink data retransmissions; and
sending the paging message to the UE on the occasion.

6. The method according to claim 1, wherein determining, by the base station, the first parameter of the UE comprises:
configuring, by the base station, the first parameter; or
determining, by the base station, the first parameter according to a maximum interval between downlink data retransmissions which is received from a core network.

7. The method according to claim 1, wherein negotiating, by the base station, with the core network about the maximum delay of the downlink data transmission or the maximum interval between downlink data retransmissions comprises:
pre-determining, by the base station, the maximum delay of the downlink data transmission, and sending a UE-specific connection setup or resume request carrying the maximum delay of the downlink data transmission or the maximum interval between downlink data retransmissions to the core network; or
receiving, by the base station, a UE-specific connection setup or resume response carrying the maximum interval between downlink data retransmissions, which is sent by the core network; or
determining, by the base station, the maximum delay of the downlink data transmission based on the first parameter configured, and sending the maximum delay of the downlink data transmission or the maximum interval between downlink data retransmissions to the core network via dedicated signaling.

8. The method according to claim 1, wherein in response to determining that the base station negotiates with the core network about the maximum delay of the downlink data transmission or the maximum interval between downlink data retransmissions before sending the first parameter, the first parameter needs to ensure that a duration for which the UE performs no paging monitoring is shorter than or equal to the maximum delay of the downlink data transmission or the maximum interval between downlink data retransmissions.

9. A base station, comprising a memory, a processor and a computer program stored in the memory and executable by the processor, wherein the computer program, when executed by the processor, implements the terminal energy-saving method according to claim 1.

10. A non-transitory computer-readable storage medium, storing an information processing program which, when executed by a processor, implements the terminal energy-saving method according to claim 1.

11. A terminal energy-saving method, comprising:
receiving, by a user equipment (UE), a first parameter, wherein the first parameter comprises at least one of a paging enhanced discontinuous reception (eDRX) parameter or a deep sleep parameter; and
saving energy according to the first parameter,
wherein before or after receiving the first parameter, the method further comprises:
negotiating, by a base station, with a core network about a maximum delay of a downlink data transmission or a maximum interval between downlink data retransmissions, and maintaining a connection between the base station and the core network.

12. The method according to claim 11, wherein the paging eDRX parameter comprises a paging eDRX cycle or a paging eDRX interval, and a length of a paging time window (PTW) of the UE in one paging eDRX cycle; and
the deep sleep parameter comprises a timer for determining that the UE enters a deep sleep mode and a maximum duration of the deep sleep mode of the UE.

13. The method according to claim 12, wherein saving the energy according to the first parameter comprises:
in a case where the first parameter comprises the paging eDRX parameter and the UE is in the idle state, performing paging monitoring within the PTW configured in the paging eDRX parameter; or
in a case where the first parameter comprises the deep sleep parameter, performing radio quality measurement and paging monitoring in response to the UE being in a normal mode in the idle state, and performing neither the radio quality measurement nor the paging monitoring in response to the UE being in the deep sleep mode; or
in a case where the first parameter comprises the paging eDRX parameter and the deep sleep parameter and the UE is in a normal mode in the idle state, performing paging monitoring within the PTW configured in the paging eDRX parameter.

14. The method according to claim 13, wherein in the case where the first parameter comprises the deep sleep parameter, in response to determining that a duration for which no user data and/or no signaling are sent or received is longer than a duration of the timer for determining that the UE enters the deep sleep mode, the UE in the normal mode in the idle state enters the deep sleep mode, or in response to determining that a data sending requirement exists or a duration for which the UE is in the deep sleep mode is longer than the maximum duration of the deep sleep mode of the UE, the UE in the deep sleep mode enters the normal mode in the idle state.

15. The method according to claim 11, wherein receiving, by the UE, the first parameter comprises:

receiving, by the UE, a radio resource control (RRC) connection release message, wherein the RRC connection release message carries the first parameter.

16. The method according to claim 11, further comprising:

in a case where the UE is in a deep sleep mode and has uplink data to be sent, directly initiating, by the UE, an RRC connection setup or resume request or an early data transmission (EDT) request to a base station.

17. A terminal, comprising a memory, a processor and a computer program stored in the memory and executable by the processor, wherein the computer program, when executed by the processor, implements the terminal energy-saving method according to claim 11.

18. A non-transitory computer-readable storage medium, storing an information processing program which, when executed by a processor, implements the terminal energy-saving method according to claim 11.

19. A terminal energy-saving system, comprising a base station and a terminal, and further comprising a core network maintaining a connection with the base station;

wherein the base station determines a first parameter of the terminal, wherein the first parameter comprises at least one of a paging enhanced discontinuous reception (eDRX) parameter or a deep sleep parameter, and the base station sends the first parameter;

wherein before or after the base station sends the first parameter, the base station negotiates with a core network about a maximum delay of a downlink data transmission or a maximum interval between downlink data retransmissions, and maintains a connection between the base station and the core network, wherein the terminal receives the first parameter and saves energy according to the first parameter; and wherein the core network is configured to negotiate with the base station about a maximum delay of a downlink data transmission or a maximum interval between downlink data retransmissions.

* * * * *